(12) United States Patent
Minoo et al.

(10) Patent No.: US 12,122,617 B2
(45) Date of Patent: Oct. 22, 2024

(54) UNLOADER

(71) Applicant: Daifuku Co., Ltd., Osaka (JP)

(72) Inventors: Atsushi Minoo, Tokyo (JP); Wataru Kiyokawa, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 18/373,003

(22) Filed: Sep. 26, 2023

(65) Prior Publication Data

US 2024/0101362 A1 Mar. 28, 2024

(30) Foreign Application Priority Data

Sep. 27, 2022 (JP) ................................. 2022-153929

(51) Int. Cl.
*B65G 47/90* (2006.01)
*B25J 13/08* (2006.01)
*B65G 59/04* (2006.01)

(52) U.S. Cl.
CPC ............ *B65G 47/905* (2013.01); *B25J 13/08* (2013.01); *B65G 59/04* (2013.01)

(58) Field of Classification Search
CPC ........ B65G 1/137; B65G 57/04; B65G 59/04; B65G 47/905; G05B 2219/40053; B25J 13/08

See application file for complete search history.

(56) References Cited

U.S. PATENT DOCUMENTS

| 4,110,736 A * | 8/1978 | Kono ..................... G06V 10/46 |
| | | 382/199 |
| 4,561,176 A * | 12/1985 | Leddet ..................... B23P 19/10 |
| | | 29/709 |
| 4,819,167 A * | 4/1989 | Cheng ................... H01L 21/681 |
| | | 700/59 |
| 4,926,345 A * | 5/1990 | Novak .................. B25J 9/1692 |
| | | 901/41 |
| 5,704,757 A * | 1/1998 | Furuta .................. B65H 3/0816 |
| | | 271/106 |
| 10,315,865 B2 * | 6/2019 | Eto ......................... B65G 67/24 |
| 10,902,377 B2 * | 1/2021 | Murphy ............... G05B 19/124 |
| 10,987,807 B2 * | 4/2021 | Rodrigues .............. B25J 9/1697 |
| 2015/0197009 A1 * | 7/2015 | Melikian ................ B25J 9/1669 |
| | | 901/47 |
| 2020/0047331 A1 * | 2/2020 | Chitta ..................... B25J 9/1612 |

(Continued)

FOREIGN PATENT DOCUMENTS

JP 2002128275 A 5/2002

*Primary Examiner* — Gregory W Adams
(74) *Attorney, Agent, or Firm* — The Webb Law Firm

(57) ABSTRACT

An unloader includes a suction device including a suction portion, a mover, a controller, and an article detector. The controller moves the suction portion relative to a mount in a first predetermined direction to switch from a state in which a vertical relative distance is greater than a greater one of an article height or a predetermined distance and is less than a total length of the article height and the predetermined distance and in which a detection line is located in a second predetermined direction from a target article group to a state in which the detection line is located in the first predetermined direction from the target article group, and prohibits an operation to move the suction portion in a vertical direction toward the target article group when the article detector detects an article.

6 Claims, 9 Drawing Sheets

(56) References Cited

U.S. PATENT DOCUMENTS

2020/0246979 A1\* 8/2020 Wada ...................... G06T 19/00
2021/0053216 A1\* 2/2021 Diankov ................ B25J 9/1669
2021/0101760 A1\* 4/2021 Yabe ................... B25J 15/0616

\* cited by examiner

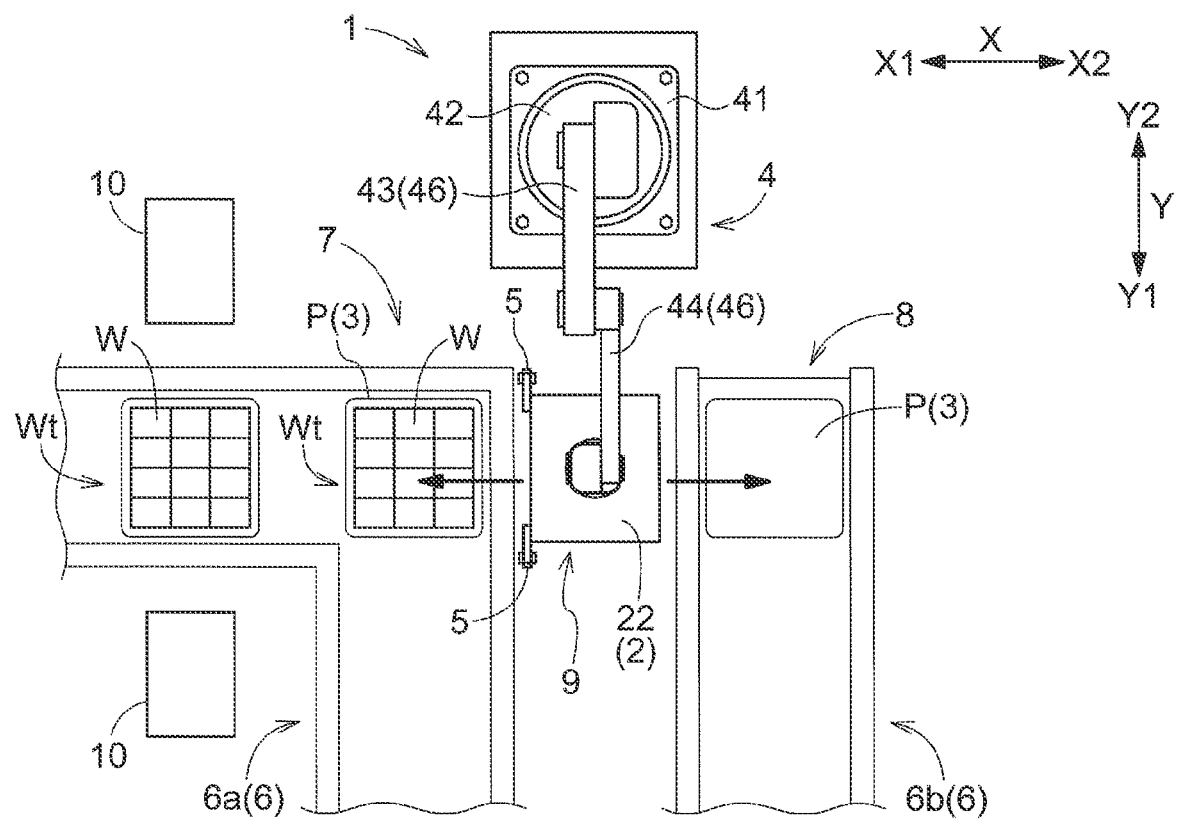

UNLOADER

CROSS REFERENCE TO RELATED APPLICATION

This application claims priority to Japanese Patent Application No. 2022-153929, filed Sep. 27, 2022, the disclosure of which is hereby incorporated by reference in its entirety.

BACKGROUND OF THE INVENTION

Field of the Invention

The present invention relates to an unloader for separating, from a stack of multiple articles on a mount, a target article group including multiple articles in a topmost layer.

Description of Related Art

An example of such an unloader is described in Japanese Unexamined Patent Application Publication No. 2002-128275 (Patent Literature 1). Reference signs in parentheses used hereafter in describing the background are the reference signs in Patent Literature 1.

An unloader (picker 1) in Patent Literature 1 includes a clamping assembly (2) and a lifter (10). Multiple articles (products 6) are stacked on the lifter with a pallet (P). The clamping assembly (2) performs picking of articles in the topmost layer or located on the top. More specifically, the lifter (10) moves upward and places an article group in an intended layer at positions corresponding to the positions of pressers (7) in the clamping assembly (2). The article group in the intended layer is then held with two pairs of pressers (7). The lifter (10) moves downward in this state, separating the article group in the topmost layer to the intended layer from the article group in the layers lower than the intended layer.

In a stack of articles including multiple articles, adjacent articles may be attached to each other with, for example, glue to avoid collapsing. In this case, one or more articles in the article group held by the pressers (7) may not be separated from the stack of articles below the article group and may remain on the lifter. The unloader in Patent Literature 1 includes a remaining article sensor (22) located below the pressers (7) to detect unseparated, remaining articles.

The unloader in Patent Literature 1 includes the clamping assembly (2) as described above to hold an article group in an intended layer from sides. Another unloader suctions an upper surface of an article group in the topmost layer with its suction portion and separates the article group in the topmost layer from a stack of articles below the article group. Such an unloader may leave one or more articles in the topmost layer unseparated. In this case, the remaining articles may be hit by the suction portion moving toward the stack of articles from above. Besides one or more articles being left as described above, similar issues may occur with, for example, incorrect information about the positional relationship between the article group in the topmost layer and the suction portion, or in other words, with the unloader incorrectly identifying the number of layers in the stack of articles, the article height, or other information.

SUMMARY OF THE INVENTION

Thus, techniques are awaited for an unloader that appropriately detects articles in the topmost layer and reflects the detection result in its unloading operation to suction an article group in the topmost layer to separate the article group from a stack of articles below the article group.

An unloader according to an aspect of the present disclosure is an unloader for separating a target article group of articles in a topmost layer of a stack of articles on a mount. The unloader includes a suction device including a suction portion to suction an upper surface of the target article group to hold the target article group, a mover that moves the mount and the suction portion relative to each other along a predetermined axis parallel to a horizontal direction and in a vertical direction, a controller that controls the suction device and the mover, and an article detector that detects, at a position spaced downward from a suction surface by a predetermined distance and adjacent to the suction surface in a first predetermined direction being one direction along the predetermined axis, an article intersecting with a detection line extending along a predetermined width axis being parallel to the horizontal direction and orthogonal to the predetermined axis. The suction surface is a surface of the suction portion to be in contact with the upper surface of the target article group. The controller obtains control information to compute a vertical relative distance being a relative distance between the upper surface of the target article group and the suction surface in the vertical direction, performs a predetermined-direction moving process of operating the mover to move the suction portion relative to the mount in the first predetermined direction to switch from a state in which the vertical relative distance based on the control information is greater than a greater one of an article height being a vertical dimension of the article included in the target article group or the predetermined distance and is less than a total length of the article height and the predetermined distance and in which the detection line is located in a second predetermined direction being another direction along the predetermined axis from the target article group to a state in which the detection line is located in the first predetermined direction from the target article group, and prohibits the mover from operating to move the suction portion in the vertical direction toward the target article group when the article detector detects the article during the predetermined-direction moving process.

In this structure, the detection line moves along the upper surface of the target article group along the predetermined axis while maintaining the vertical relative distance being greater than the greater one of the article height or the predetermined distance and less than the total length of the article height and the predetermined distance. This allows appropriate detection of an article above the upper surface of the target article group.

When such an article is detected, or in other words, when an article is located in an area that is expected to include no article, the mover is prohibited from operating to move the suction portion in the vertical direction toward the target article group. This reduces the possibility of at least one of the suction portion or the article being damaged from a collision between them.

This structure thus can detect an article in the topmost layer and can reflect the detection result in its unloading operation.

Further aspects and features of the unloader will be apparent from exemplary and nonlimiting embodiments described below with reference to the drawings.

BRIEF DESCRIPTION OF THE DRAWINGS

FIG. 15 is a plan view of an article transfer facility in another embodiment.

DESCRIPTION OF THE INVENTION

Figure 1:
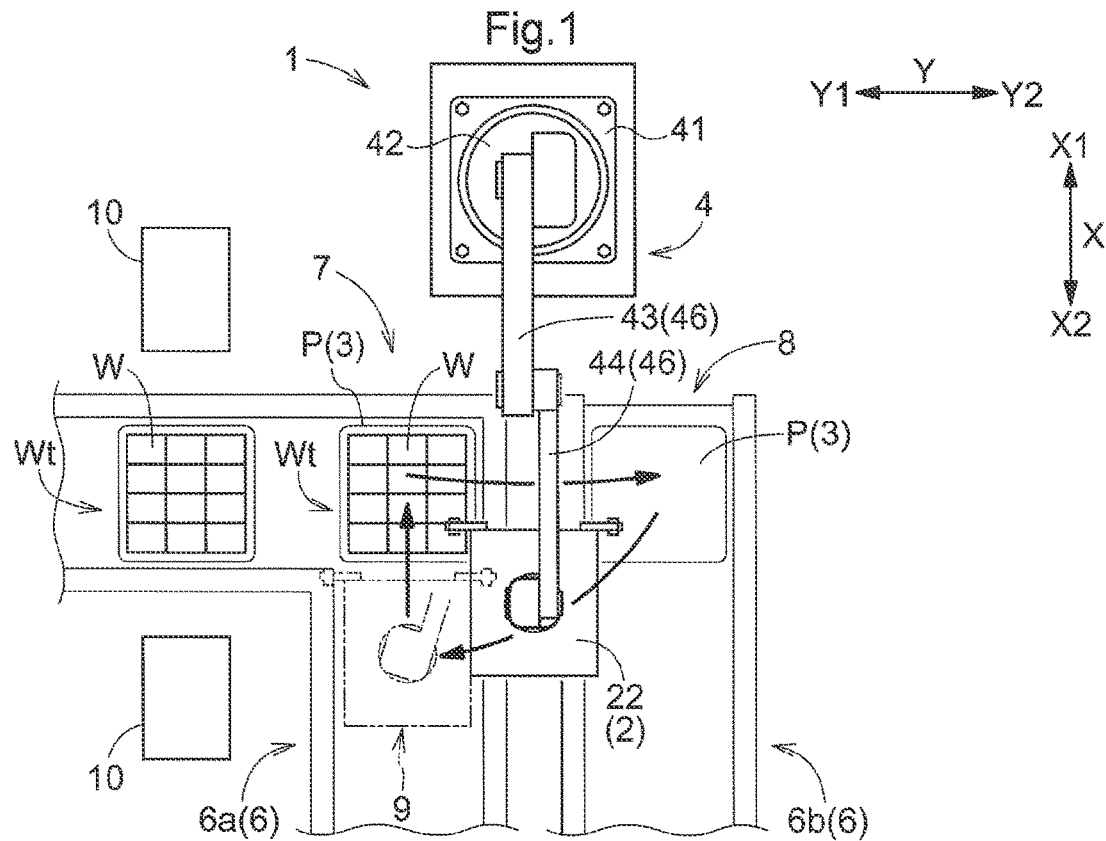
FIG. 1 is a plan view of an article transfer facility.

An unloader 1 used at an article transfer facility will now be described as an example with reference to the drawings. In the present embodiment, as shown in FIG. 1, the article transfer facility includes the unloader 1, a transporter 6, and an automated warehouse (not shown). In the present embodiment, the unloader 1 transfers multiple articles W delivered from the automated warehouse from a pickup area 7 to a transfer area 8. The transporter 6 transports multiple articles W delivered from the automated warehouse to the pickup area 7 and transports multiple articles W in the transfer area 8 to outside the automated warehouse.

Figure 2:
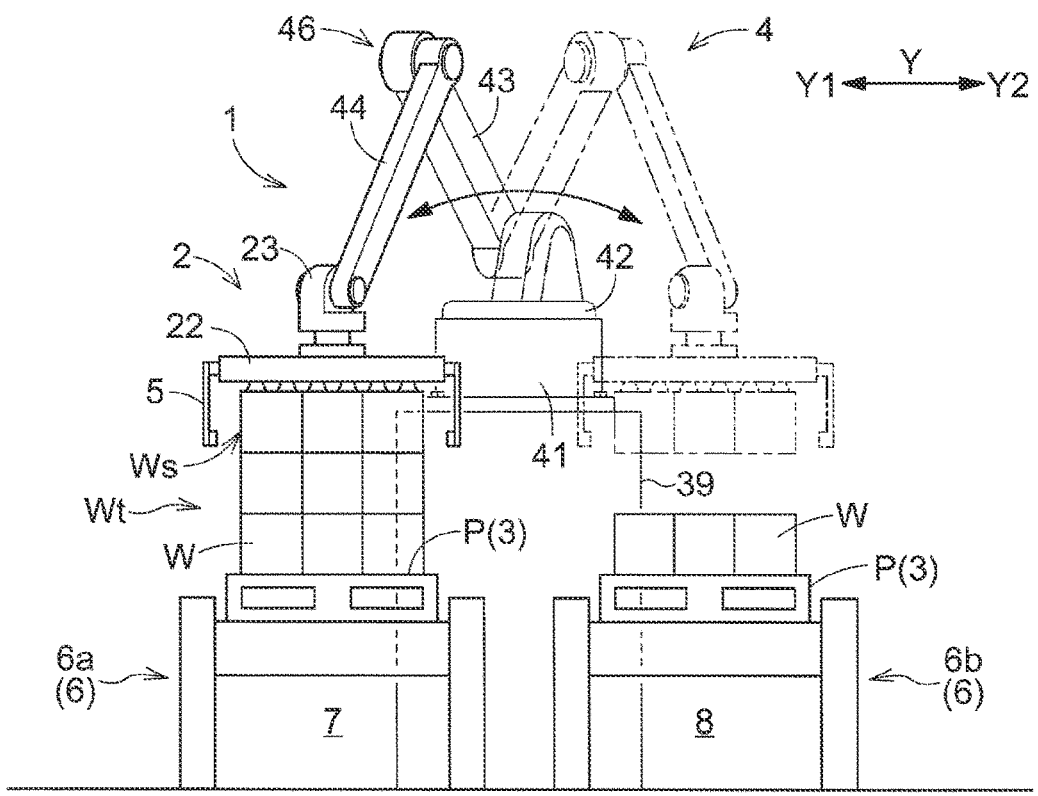
FIG. 2 is a front view of an unloader and a stack of articles.

In the present embodiment, as shown in FIGS. 1 and 2, the transporter 6 includes a first conveyor 6a and a second conveyor 6b. The first conveyor 6a transports multiple articles W from the automated warehouse to the pickup area 7. The first conveyor 6a also transports articles W left without being transferred by the unloader 1 from the pickup area 7 to the automated warehouse. The second conveyor 6b transports, from the transfer area 8 to outside the article transfer facility, multiple articles W transferred from the pickup area 7 to the transfer area 8. The second conveyor 6b may transport articles W to the automated warehouse.

Hereafter, a predetermined axis X parallel to a horizontal direction extends in one direction referred to as a first predetermined direction X1 and in the other direction referred to as a second predetermined direction X2. A predetermined width axis Y is parallel to the horizontal direction and orthogonal to the predetermined axis X. In the present embodiment, the predetermined width axis Y extends in one direction referred to as a first predetermined width direction Y1 and in the other direction referred to as a second predetermined width direction Y2. Extending in a direction herein is not limited to extending in parallel to the direction, and includes being inclined with respect to the direction (more specifically, being slightly inclined with respect to the direction, such as being substantially parallel to the direction).

In the present embodiment, as shown in FIG. 1, a mount 3 is located in the pickup area 7. The transfer area 8 is set adjacent to the pickup area 7 in one direction along the predetermined width axis Y. A standby area 9 is set adjacent to the pickup area 7 in the second predetermined direction X2. In the present embodiment, the transfer area 8 is adjacent to the pickup area 7 in the second predetermined width direction Y2. In the illustrated example, the transfer area 8 is spaced from the pickup area 7 by a distance less than the dimension of a suction device 2 (more specifically, a suction support 22) described later in the predetermined width direction Y. The transfer area 8 and the pickup area 7 are located in the second predetermined direction X2 from the unloader 1 (more specifically, a fixed portion such as a base 41 described later). The standby area 9 is located in the second predetermined direction X2 from the pickup area 7 and the transfer area 8.

In the present embodiment, as shown in FIGS. 1 and 2, stacked multiple articles W (hereafter referred to as a stack of articles Wt) on a mount 3 are located in the pickup area 7. In the present embodiment, the mount 3 is a pallet P. In other words, the stack of articles Wt is placed on the pallet P. In the present embodiment, a pallet P is located as a mount 3 in the transfer area 8 as well. Articles W transferred from the pickup area 7 are loaded on the pallet P in the transfer area 8. In the example shown in FIGS. 1 and 2, the pickup area 7 is on a transport surface of the first conveyor 6a. The transfer area 8 is on a transport surface of the second conveyor 6b. The articles W are containers with lids accommodating various items such as food, drinking water, machine components, or other items. In the present embodiment, a single stack of articles Wt is to include multiple articles W being containers of the same shape and dimensions. In the illustrated examples, the articles W are cardboard boxes. The mount 3 is not limited to the pallet P and may be, for example, a lift mount in a lifter or a transport surface of a conveyor. In other words, the articles W may not be placed on a pallet P.

Figure 5:
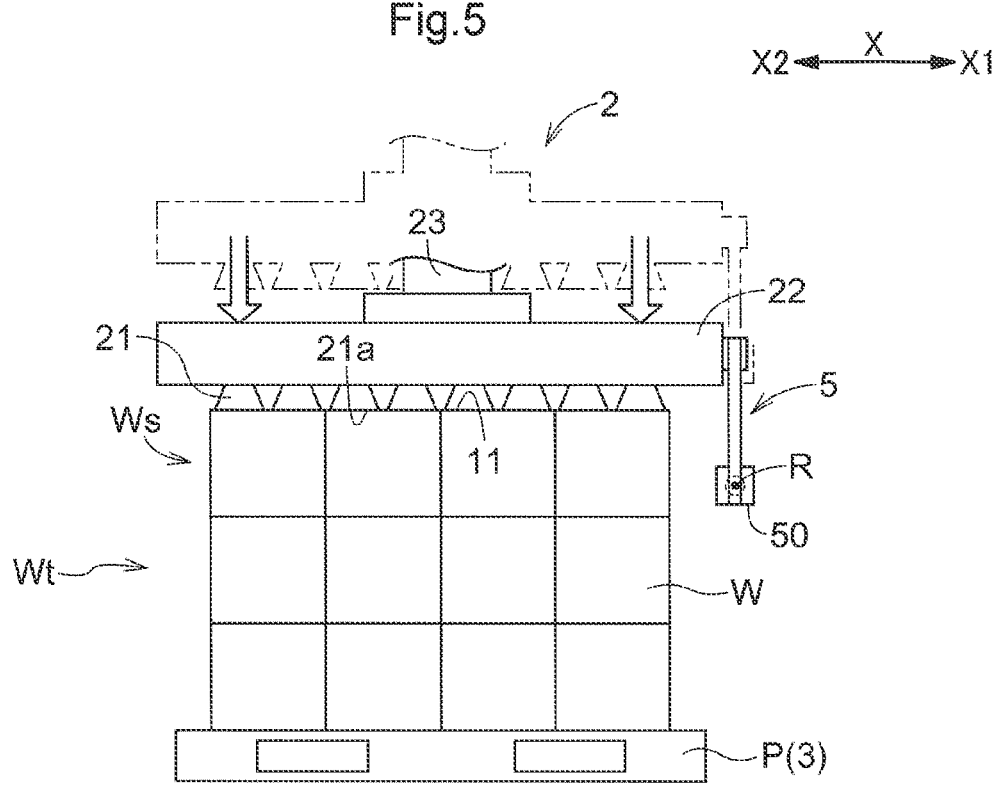
FIG. 5 is a schematic side view of the suction device suctioning a target article group in a normal unloading operation.
Figure 6:
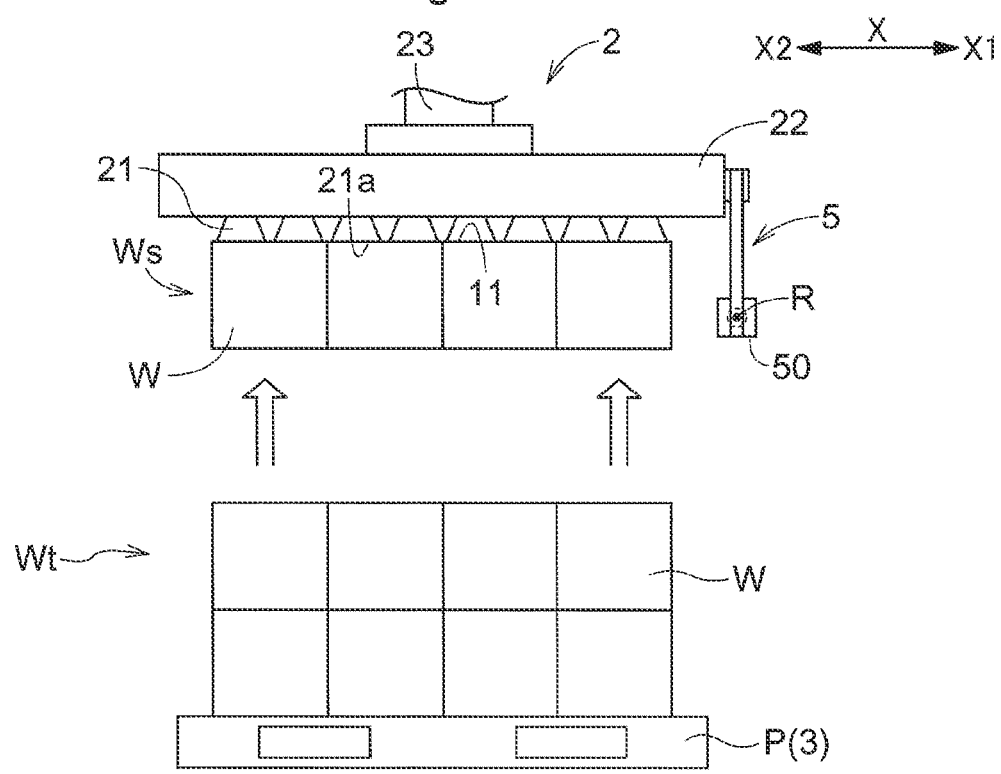
FIG. 6 is a schematic side view of the suction device suctioning and lifting the target article group.

As shown in FIGS. 5 and 6, the unloader 1 separates, from the stack of articles Wt including multiple articles W on the mount 3, a target article group Ws of multiple articles W in the topmost layer of the stack of articles Wt. In the present embodiment, the unloader 1 lifts the target article group Ws relative to the stack of articles Wt below the target article group Ws in the pickup area 7. The target article group Ws is thus separated from the stack of articles Wt below. In the present embodiment, the unloader 1 separates all articles W included in the target article group Ws from the stack of articles Wt below. The unloader 1 will now be described more specifically below.

As shown in FIGS. 1, 2, 3, and 11, the unloader 1 includes a suction device 2 including a suction portion 21 that suctions the upper surface 11 of the target article group Ws to hold the target article group Ws, a mover 4 that moves the mount 3 and the suction portion 21 relative to each other along the predetermined axis X in the horizontal direction and in a vertical direction, and a controller 100 that controls the suction device 2 and the mover 4. In the present embodiment, the unloader 1 further includes a height detector 10.

Figure 3:
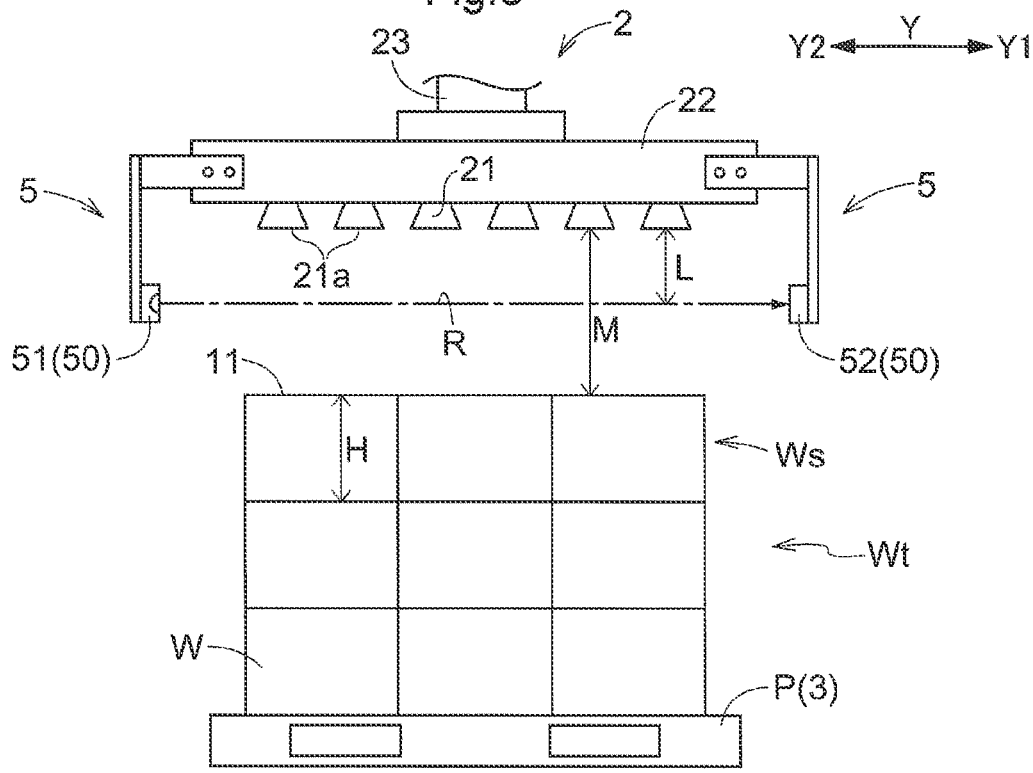
FIG. 3 is a schematic front view of a suction device, an article detector, and the stack of articles.
Figure 8:
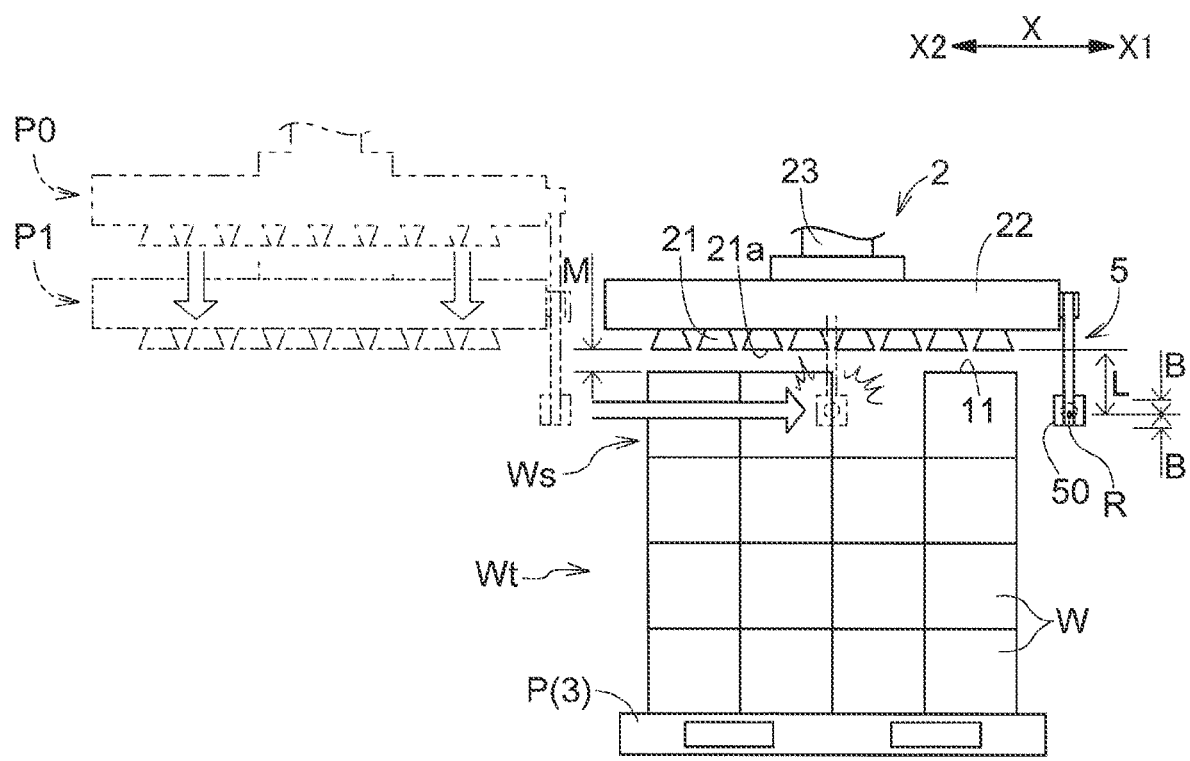
FIG. 8 is a schematic side view of the suction device, the article detector, and the stack of articles in an initial predetermined-direction moving process.

In the present embodiment, as shown in FIGS. 1, 3, and 8, the height detector 10 detects an initial height being the vertical dimension of the stack of articles Wt in an initial state in which no target article group Ws is separated. In the present embodiment, the height detector 10 is at a position along a transportation path of the first conveyor 6a and detects the height of the stack of articles Wt being transported to the pickup area 7 on the first conveyor 6a. The height detector 10 thus detects the height of the stack of articles Wt in the initial state in which no article W (target article group Ws) is separated from the stack of articles Wt. The information about the initial height indicating the height of the stack of articles Wt in the initial state is output to the controller 100. The controller 100 thus obtains, from the height detector 10, information about the initial height as control information 101. The controller 100 moves the suction portion 21 to a position corresponding to a target article group Ws in the stack of articles Wt based on the information about the initial height.

In the present embodiment, as shown in FIGS. 1 and 2, the mover 4 moves the suction portion 21 along the predetermined axis X, along the predetermined width axis Y, and in the vertical direction. The mover 4 can thus lift the suction portion 21 suctioning and holding the target article group Ws from the mount 3 and the stack of articles Wt below the target article group Ws. The mover 4 can also move the suction portion 21 between the pickup area 7, the transfer area 8, and the standby area 9. In the present embodiment, as shown in FIGS. 1 and 2, the mover 4 includes the base 41, a rotator 42, and robotic arms 46 (a first arm 43 and a second arm 44). The base 41 is fixed to a platform 39. The rotator 42 is supported by the base 41 in a rotatable manner about a vertical axis. The first arm 43 has a basal end swingably connected to the rotator 42. The second arm 44 has a basal end swingably connected to the distal end of the first arm 43. The suction device 2 is connected to the distal end of the second arm 44.

In the present embodiment, as shown in FIGS. 2 and 3, the suction device 2 includes the suction portion 21, a suction support 22, and a connector 23. In the present embodiment, the suction support 22 supports the suction portion 21. In the present embodiment, the suction support 22 supports multiple suction portions 21 (suction pads) arranged in a plane from above. The connector 23 connects the suction support 22 to the mover 4. In the illustrated example, the connector 23 has a basal end swingably connected to the distal end of the second arm 44 in the mover 4. The connector 23 has a distal end fixed to an upward-facing surface of the suction support 22. The suction portions 21 and the suction support 22 can move freely within a predefined area (in the illustrated example, within a movable area of the moving robotic arms 46) using rotation of the rotator 42 in the mover 4 and swing of the first arm 43, the second arm 44, and the connector 23. The unloader 1 with the above structure can transfer the target article group Ws held by the suction portions 21 from the pickup area 7 to the transfer area 8.

Figure 4:
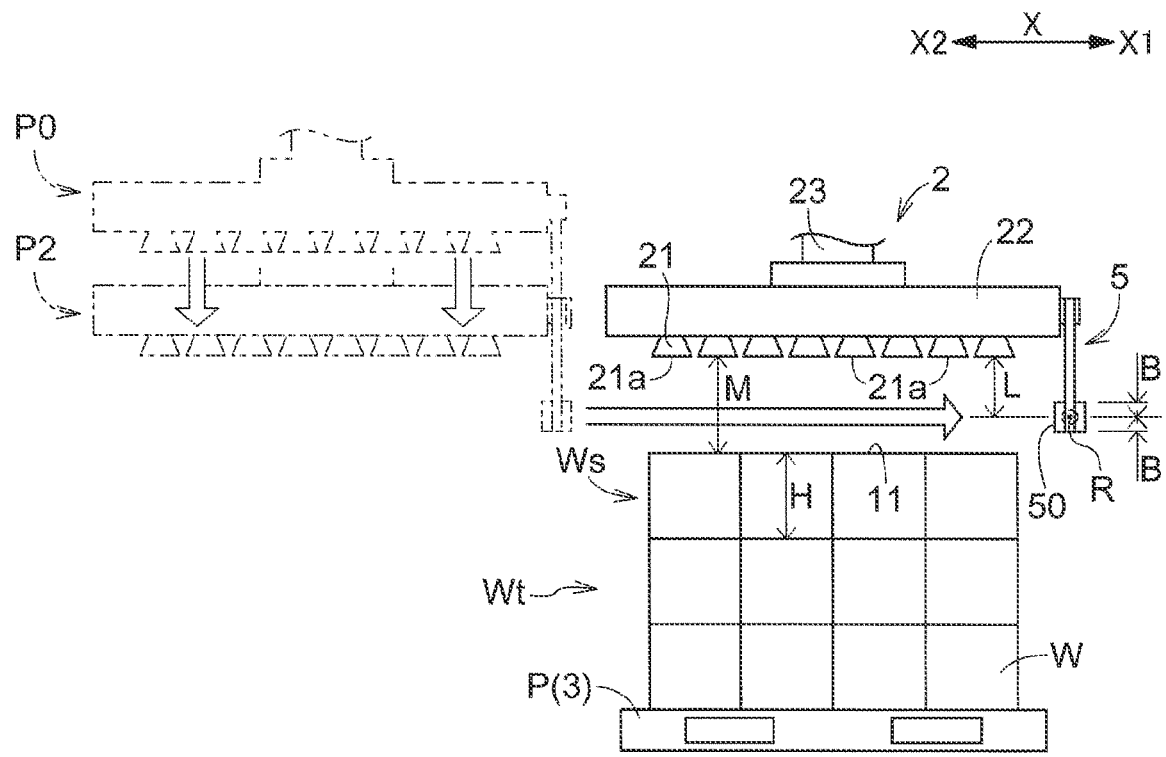
FIG. 4 is a schematic side view of the suction device, the article detector, and the stack of articles in a predetermined-direction moving process.

In the present embodiment, as shown in FIGS. 2, 3, and 4, the suction support 22 supports the multiple suction portions 21. More specifically, the multiple suction portions 21 are arranged in a plane on a downward-facing surface of the suction support 22. In the present embodiment, each suction portion 21 is elastically deformable in the vertical direction. In the present embodiment, each suction portion 21 is a suction pad. In other words, each suction portion 21 is a bellows extendable in the vertical direction. Each suction pad as the suction portion 21 has a lower surface serving as a suction surface 21a to be in contact with the upper surface 11 of the target article group Ws. Thus, in the present embodiment, deformation in a suction pad changes the position of the corresponding suction surface 21a relative to the suction support 22 or an article detector 5. The structure according to the present embodiment includes the multiple suction portions 21 arranged in a plane. Thus, the lower surfaces of the suction portions 21 collectively define the suction surface 21a. Each suction portion 21 is connected to a valve (not shown) and a suctioning device (not shown) such as a pump with a tube (not shown). The controller 100 controls the valves to switch the state of the suction portions 21 between a suction state for suctioning the articles W and a suction release state for not suctioning the articles W. In the present embodiment, the multiple suction portions 21 each have the same structure. In the present embodiment, each suction portion 21 is fixed to the suction support 22 as described above and moves integrally with the suction support 22. In some embodiments, each suction portion 21 may move independently. In this case, the suction device 2 may include, for example, neither the suction support 22 nor the connector 23. Each suction portion 21 may be directly connected to the distal end of the second arm 44.

As shown in FIGS. 3 and 4, the unloader 1 further includes the article detector 5. The article detector 5 detects an article W at a position spaced downward from the suction surface 21a by a predetermined distance L and adjacent to the suction surface 21a in the first predetermined direction X1. The article W intersects with a detection line R extending along the predetermined width axis Y. The suction surface 21a is the surfaces of the suction portions 21 to be in contact with the upper surface 11 of the target article group Ws. In the present embodiment, the article detector 5 is connected to the suction portions 21 and moves integrally with the suction portions 21. The relative position between the article detector 5 and the suction support 22 is fixed. Without deformation in each suction portion 21, the relative position between the article detector and each suction portion 21 is also fixed. Thus, the article detector 5 is connected to the suction portions 21 to move upward or downward integrally with the suction portions 21. In the present embodiment, the article detector 5 is fixed to an end of the suction support 22 in the first predetermined direction X1. The article detector 5 is located adjacent to the suction portions 21 in the first predetermined direction X1. In the present embodiment, the predetermined distance L is a distance from the suction surface 21a without deformation in each suction portion 21. The predetermined distance L will be described more specifically later.

In the present embodiment, as shown in FIG. 3, the article detector 5 includes a transmissive optical sensor 50. The optical sensor 50 includes a light emitter 51 and a light receiver 52. The light emitter 51 and the light receiver 52 are located separately with the multiple suction portions 21 in between along the predetermined width axis Y. The light emitter 51 and the light receiver 52 are spaced downward from the suction surface 21a by the predetermined distance L, forming the detection line R extending along the predetermined width axis Y. In the present embodiment, the article detector 5 includes the transmissive optical sensor 50. In some embodiments, the article detector 5 may include a reflective optical sensor 50 including an integrated light emitter-receiver at a position in one direction along the predetermined axis X and a reflective plate at a position in the other direction along the predetermined axis X. The article detector 5 may include, for example, a sensor other than an optical sensor, such as an imaging device or an ultrasonic sensor.

Figure 11:
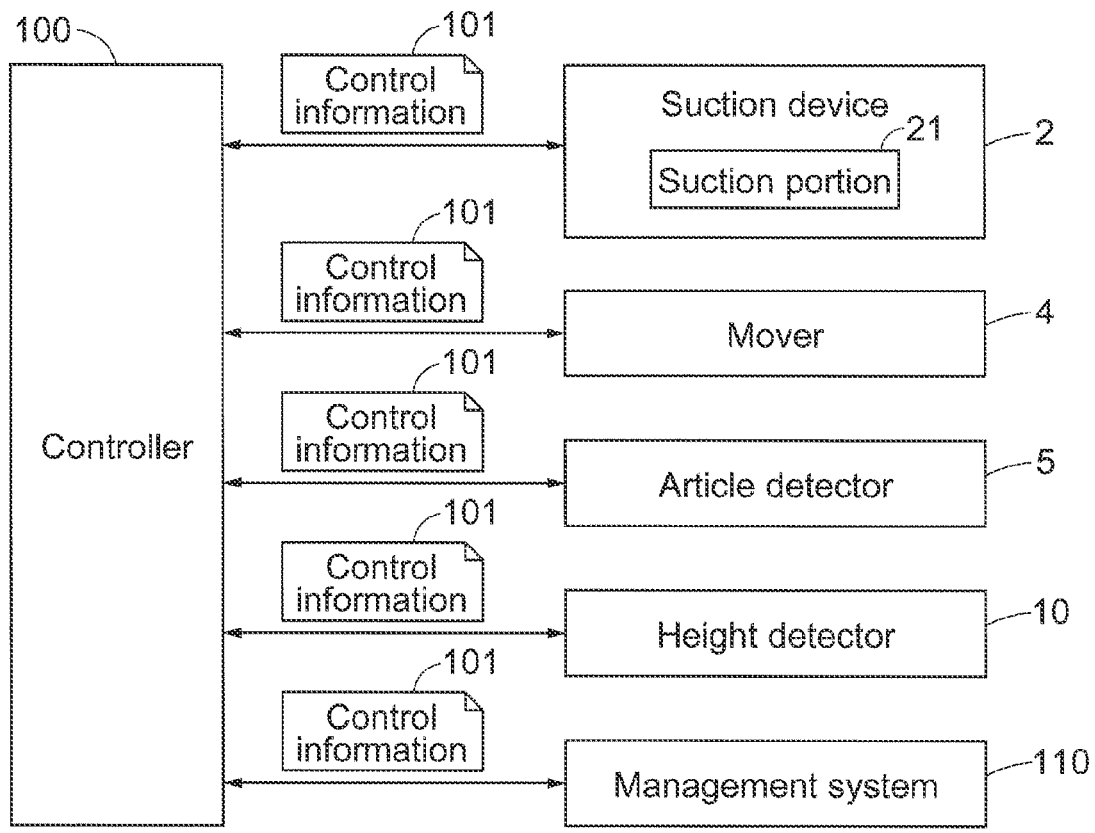
FIG. 11 is a control block diagram.

In the present embodiment, as shown in FIG. 11, the controller 100 performs computation processes and control operations described later. The controller 100 includes a computation processor such as a central processing unit (CPU) and a peripheral circuit such as a memory. The hardware implements the functions of the controller 100 in cooperation with programs executed on the hardware such as a computation processor. The controller 100 controls the suction device 2, the mover 4, the article detector 5, and the height detector 10. In the present embodiment, the controller 100 obtains control information 101 from the suction device 2, the mover 4, the article detector 5, the height detector 10, and a management system 110. The control information 101 may be obtained from a controller in a higher level than the controller 100.

Figure 12:
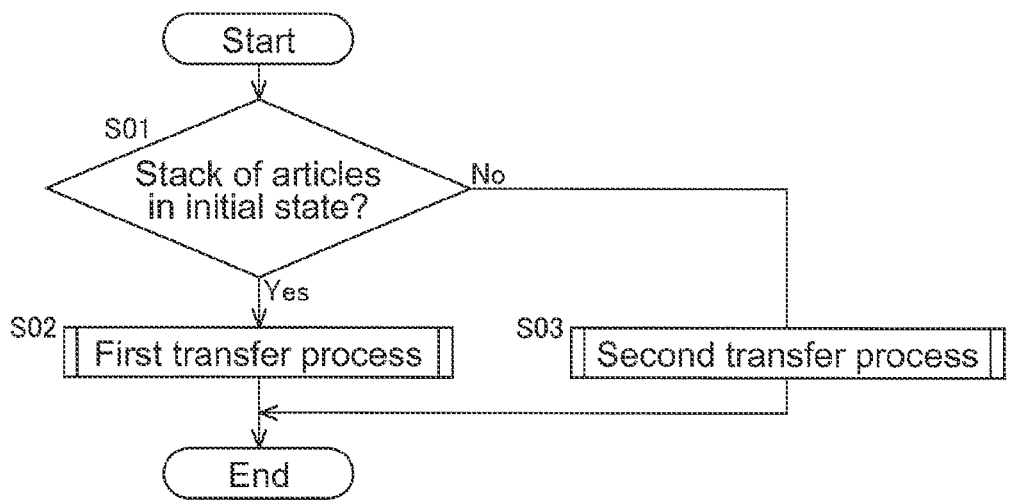
FIG. 12 is a flowchart showing a control process performed by the controller.
Figure 13:
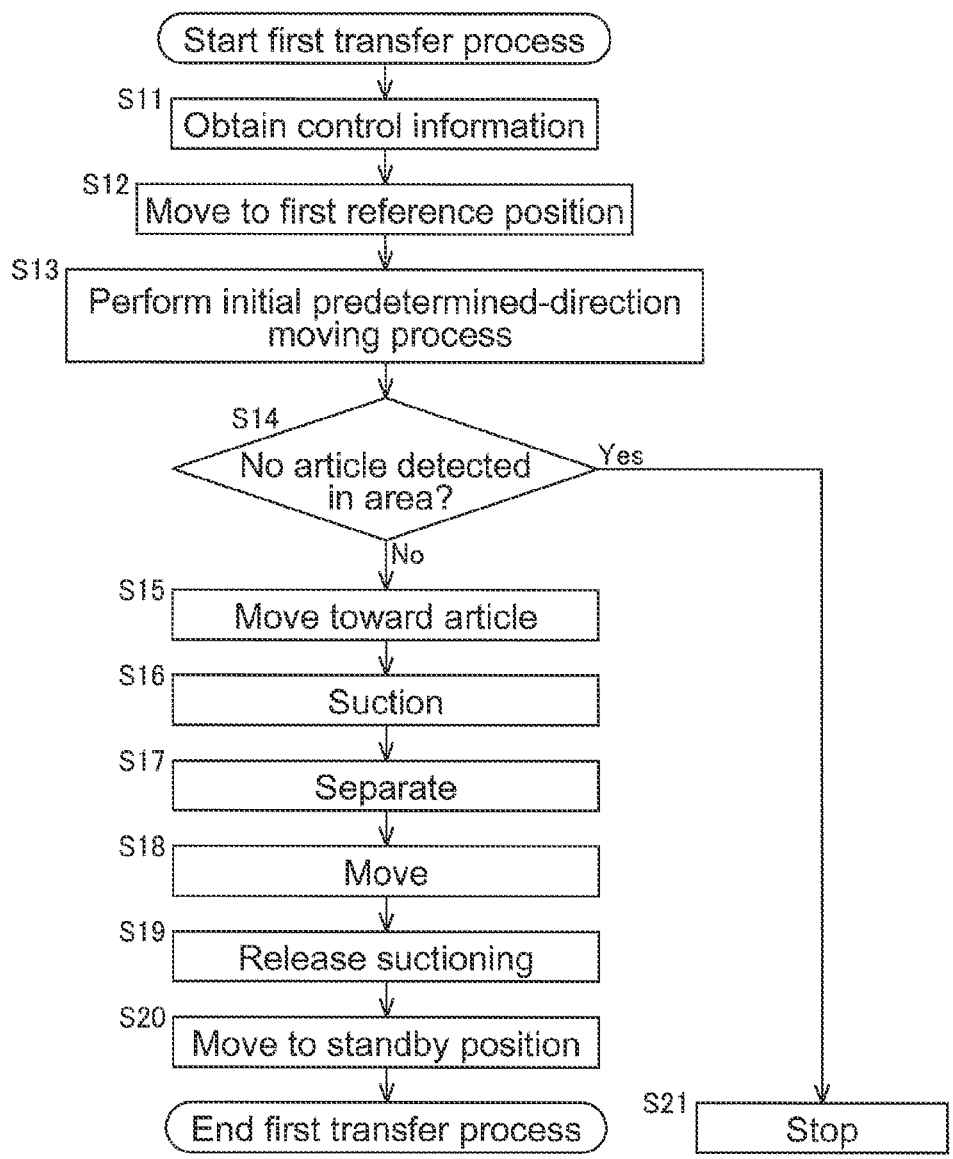
FIG. 13 is a flowchart showing a control process performed by the controller.

In the present embodiment, the controller 100 performs an initial separating operation, or in other words, a first transfer process (FIGS. 8, 12, and 13). The initial separating operation includes separating a target article group Ws from the stack of articles Wt in the initial state in which no target article group Ws is separated and transferring the target article group Ws to the transfer area 8. The controller 100 also performs a second and subsequent separation operations, or in other words, a second transfer process (FIGS. 4 to 7, 12, and 14). The second transfer process includes separating a target article group Ws in a second or lower layer in the stack of articles Wt in the initial state and transferring the target article group Ws to the transfer area 8. The second transfer process will now be described in detail first.

As shown in FIG. 11, the controller 100 obtains control information 101 to compute a vertical relative distance M being a vertical relative distance between the upper surface 11 of the target article group Ws and the suction surface 21*a*. The article height H is a vertical dimension of an article W included in the target article group Ws. The controller 100 obtains the control information 101 from the suction device 2, the mover 4, the article detector 5, and the height detector 10. In the present embodiment, the controller 100 obtains, as the control information 101, suction surface positional information indicating the vertical position of the suction surface 21*a* of the suction portions 21 from the mover 4. The suction surface positional information is determined based on the position of the distal end of the second arm 44 as the control information for the mover 4 and the distance (a predetermined value) between the distal end and the suction surface 21*a*. The controller 100 also obtains, as control information 101 from the article detector 5, detection information, or more specifically, information as to whether an article W is detected by the optical sensor 50. In the present embodiment, the control information 101 includes information about the initial height detected by the height detector 10, information about the number of initial layers being the number of layers included in the stack of articles Wt in the initial state, and information about the number of separate layers being the number of layers of the target article group Ws separated from the stack of articles Wt in the initial state. In the present embodiment, the controller 100 obtains information about the initial height as the control information 101 from the height detector 10 as described above. The controller 100 also obtains, from the management system 110 managing information about multiple stacks of articles Wt in the article transfer facility, information about the number of layers indicating the number of layers in the stack of articles Wt in the pickup area 7 as the control information 101. This information about the number of layers includes the information about the number of initial layers. The number of separate layers is the number of layers of the target article group Ws separated by the unloader 1 from the stack of articles Wt in the initial state. Information about the number of separate layers is obtained from the operation history of the unloader 1 stored in the controller 100.

Figure 7:
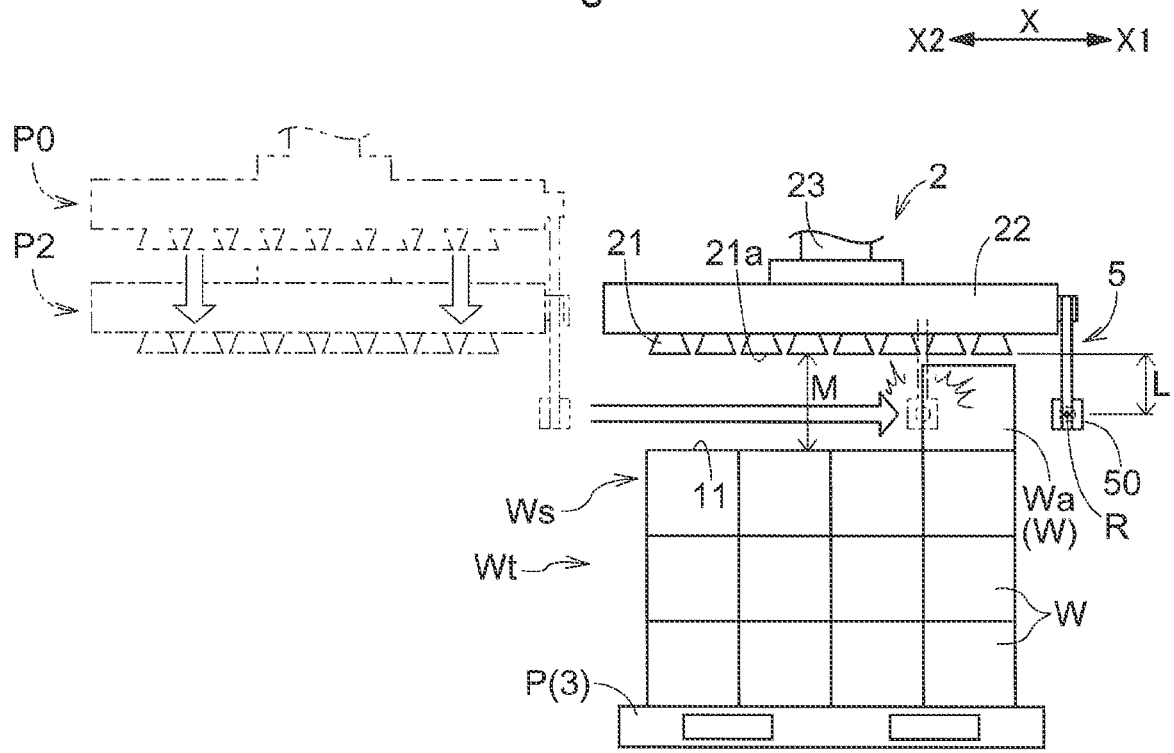
FIG. 7 is a schematic side view of the suction device, the article detector, and the stack of articles in the predetermined-direction moving process.

As shown in FIGS. 3, 4, and 7, the controller 100 computes a vertical dimension of a current stack of articles Wt being the vertical relative distance M by subtracting a separated height from the initial height. The separated height results from multiplying the article height H by the number of separate layers. The article height H results from dividing the initial height by the number of initial layers. In the present embodiment, the controller 100 further computes the vertical relative distance M using information about the relative position between the mount 3 and the suction portions 21 determined by the mover 4. More specifically, the controller 100 obtains the vertical distance between the upper surface of the mount 3 and the suction surface 21*a* from the suction surface positional information and calculates the vertical relative distance M by subtracting, from the vertical distance, the vertical dimension of the current stack of articles Wt obtained as described above. Computing the vertical relative distance M in this manner can eliminate, for example, a sensor or another device for detecting the vertical dimension of the stack of articles Wt on the mount 3 as appropriate.

Figure 14:
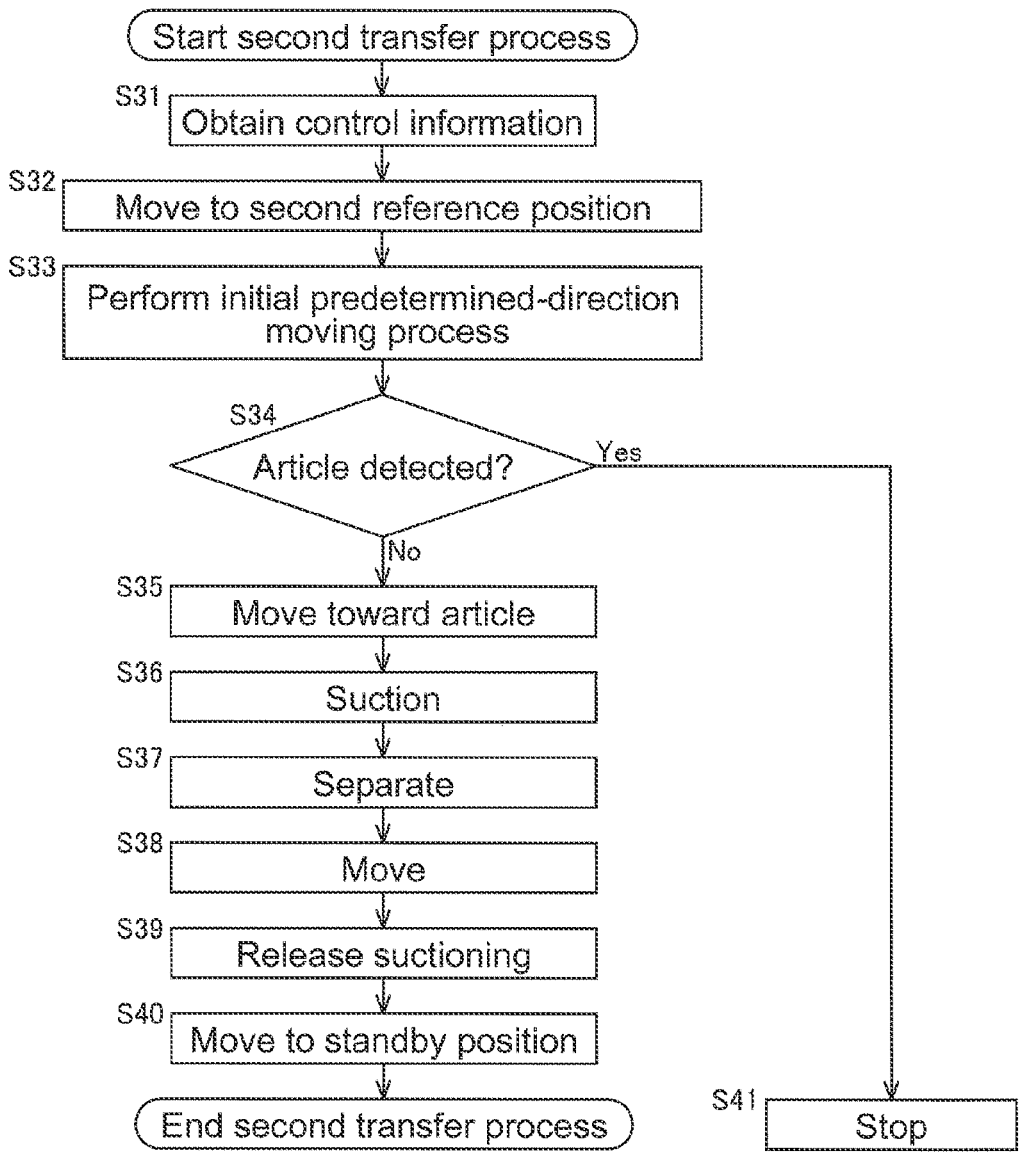
FIG. 14 is a flowchart showing a control process performed by the controller.

As shown in FIG. 4, the controller 100 performs the predetermined-direction moving process of operating the mover 4 to move the suction portions 21 relative to the mount 3 in the first predetermined direction X1 to switch from a state in which the vertical relative distance M based on the control information 101 is greater than the greater one of the article height H or the predetermined distance L and is less than a total length of the article height H and the predetermined distance L and in which the detection line R is located in the second predetermined direction X2 from the target article group Ws to a state in which the detection line R is located in the first predetermined direction X1 from the target article group Ws. As shown in FIGS. 7 and 14, when the article detector 5 detects an article W during the predetermined-direction moving process, the controller 100 prohibits the mover 4 from operating to move the suction portions 21 in the vertical direction toward the target article group Ws.

In the present embodiment, as shown in FIG. 4, the predetermined-direction moving process is performed in a state in which the vertical relative distance M based on the control information 101 is greater than a value obtained by adding a margin distance B to the greater one of the article height H or the predetermined distance L and is less than a value obtained by subtracting the margin distance B from the total length of the article height H and the predetermined distance L. The margin distance B may be greater than or equal to the maximum value of errors in the vertical relative position between the mount 3 and the suction surface 21*a* caused by the mover 4 (in other words, errors in the vertical position of the suction surface 21*a* caused by the mover 4). In the present embodiment, the height detector 10 detects the vertical dimension of the stack of articles Wt in the initial state. Thus, the margin distance B may correspond to, for example, the sum of the maximum value of errors in the vertical relative position between the mount 3 and the suction surface 21*a* caused by the mover 4 and the maximum value of detection errors in the vertical dimension of the stack of articles Wt detected by the height detector 10.

Figure 9:
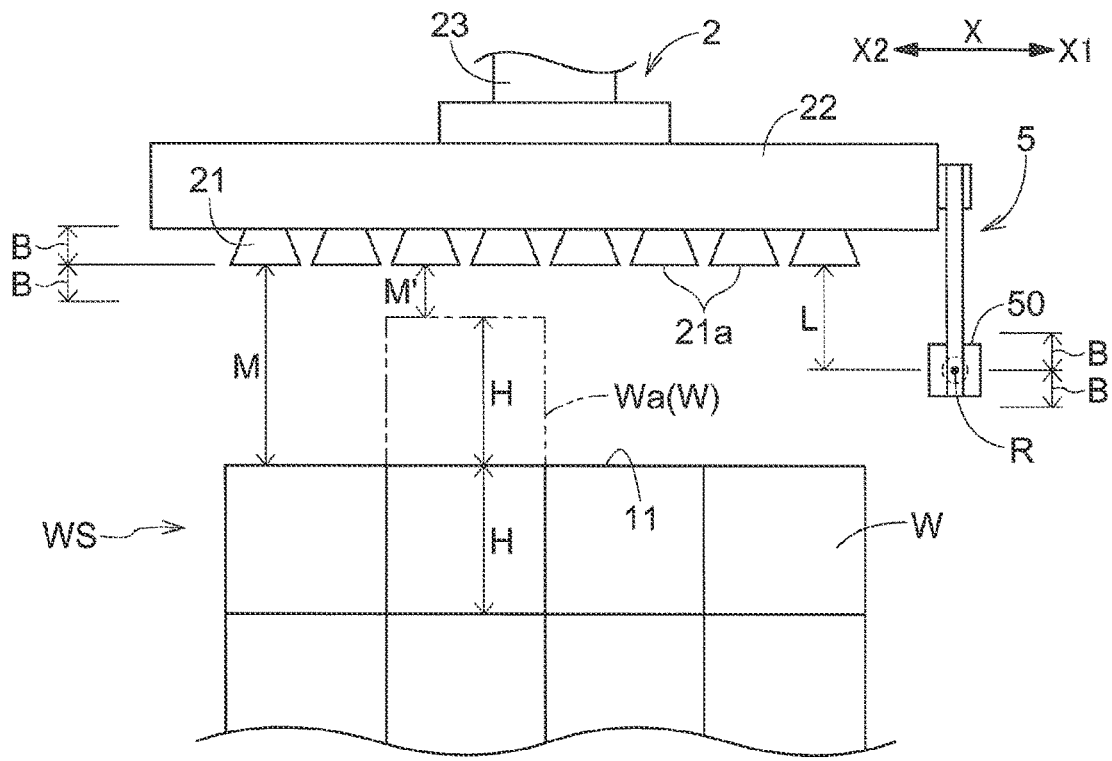
FIG. 9 is a side view of the suction portions at an example vertical position.

In the example shown in FIG. 9, the vertical relative distance M is greater than the article height H or the predetermined distance L and is less than the total length of the article height H and the predetermined distance L. When an imaginary article W (hereafter referred to as an abnormal article Wa indicated with the two-dot-dash line in FIG. 9) is located on the target article group Ws, the distance between the upper surface of the abnormal article Wa and the suction surface 21a is referred to as a virtual article relative distance M'. In the example shown in FIG. 9, no error is caused by the mover 4 in the vertical relative position between the mount 3 and the suction surface 21a. When the suction surface 21a is located lower by an error value in the vertical direction than its position without an error and the virtual article relative distance M' in the figure is less than the error value, the abnormal article Wa interferes with the suction portions 21 during the predetermined-direction moving process. Thus, to avoid interference between the abnormal article Wa and the suction portions 21 with the above error being maximum, the predetermined-direction moving process is performed in a state in which the margin distance B is greater than or equal to the maximum value of errors in the vertical relative position between the mount 3 and the suction surface 21a caused by the mover 4 and in which the vertical relative distance M is greater than a value obtained by adding the margin distance B to the greater one of the article height H or the predetermined distance L.

Figure 10:
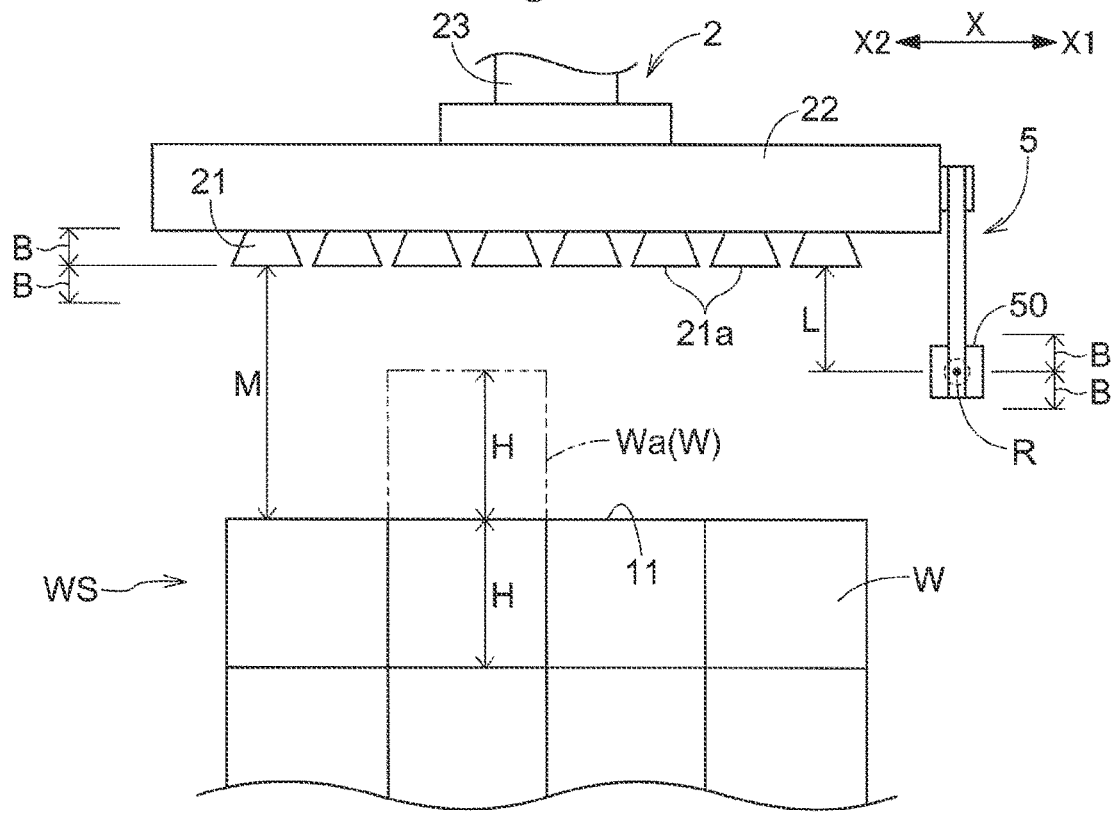
FIG. 10 is a side view of the suction portions at another example vertical position.

In the example shown in FIG. 10, the vertical relative distance M is equal to a value obtained by adding the predetermined distance L to the article height H. In other words, the abnormal article Wa (indicated by the two-dot-dash line in FIG. 10) has an upper surface located at the same vertical position as the detection line R of the article detector 5. In FIG. 10, the mover 4 causes no error in the relative vertical position between the mount 3 and the suction surface 21a. When the detection line R in the figure is located higher by an error value in the vertical direction than its position without an error, the detection line R is located higher than the upper surface of the abnormal article Wa. The detection line R does not intersect with the abnormal article Wa during the predetermined-direction moving process. Thus, to avoid the detection line R passing above the abnormal article Wa with the above error being maximum, the predetermined-direction moving process is performed in a state in which the margin distance B is greater than or equal to the maximum value of errors in the vertical relative position between the mount 3 and the suction surface 21a caused by the mover 4 and in which the vertical relative distance M is less than a value obtained by subtracting the margin distance B from the total length of the article height H and the predetermined distance L. In this manner, the controller 100 performs the predetermined-direction moving process with the vertical relative distance M within a range set based on the margin distance B. This avoids an abnormal article Wa interfering with the suction portions 21 or the detection line R moving without intersecting with the abnormal article Wa.

In the present embodiment, as shown in FIGS. 4, 9, and 10, the predetermined distance L is greater than or equal to the maximum value of errors in the vertical relative position between the mount 3 and the suction portions 21 caused by the mover 4 and is less than or equal to the article height H. In the present embodiment, the predetermined distance L is greater than or equal to the margin distance B and is less than or equal to the article height H. The margin distance B may be set as described above. For example, the margin distance B may correspond to the sum of the maximum value of errors in the vertical relative position between the mount 3 and the suction surface 21a caused by the mover 4 and the maximum value of detection errors in the vertical dimension of the stack of articles Wt detected by the height detector 10. In this case, the predetermined distance L is set to be greater than or equal to the sum of the maximum value of errors in the vertical relative position between the mount 3 and the suction surface 21a caused by the mover 4 and the maximum value of detection errors in the vertical dimension of the stack of articles Wt detected by the height detector 10 and less than or equal to the article height H. When the predetermined distance L is less than the margin distance B and the suction surface 21a is located lower by the margin distance B in the vertical direction than its position without an error in the vertical relative position between the mount 3 and the suction surface 21a caused by the mover 4, the abnormal article Wa may interfere with the suction portion 21 during the predetermined-direction moving process. When the predetermined distance L is greater than the article height H, the detection line R may not intersect with the abnormal article Wa and may intersect with the stack of articles Wt below the abnormal article Wa depending on the vertical position of the suction surface 21a. In the present embodiment, however, the predetermined distance L is set as described above, reducing the possibility of the abnormal article Wa interfering with the suction portions 21 or the detection line R intersecting with normal articles W below the abnormal article Wa. This also allows the suction portions 21, after the completion of the predetermined-direction moving process, to move downward by a minimum distance to suction the target article group Ws, reducing the cycle time for the unloading operation. In the illustrated example, the predetermined distance L is set to a distance half the article height H plus the margin distance B. For multiple types of articles W with different vertical dimensions, the height of an article W with the smallest vertical dimension may be used as the article height H.

In the present embodiment, as shown in FIGS. 4 and 7, the suction portions 21 before the predetermined-direction moving process is at a standby position P0 in the standby area 9. The standby position P0 is, for example, the same position as a second reference position P2 (described later) for a stack of articles Wt with the largest vertical dimension being placed on the mount 3.

The controller 100 computes the vertical relative distance M based on the control information 101 and controls the mover 4 to move (in the examples in FIGS. 4 and 7, to lower) the suction portions 21 from the standby position P0 in the standby area 9 to the second reference position P2. The second reference position P2 is variable in the vertical direction depending on the vertical dimension of the stack of articles Wt in the standby area 9. At the second reference position P2, the suction surface 21a is located higher by the vertical relative distance M than the upper surface 11 of the target article group Ws in the topmost layer in the stack of articles Wt.

The controller 100 then controls the mover 4 to move the suction portions 21 in the horizontal direction relative to the mount 3 and the stack of articles Wt from an area in the second predetermined direction X2 to an area in the first predetermined direction X1 while maintaining the vertical relative distance M. Thus, the article detector 5 moves from a position in the second predetermined direction X2 from the target article group Ws in the standby area 9 to a position in the first predetermined direction X1 from the target article group Ws. In other words, in the present embodiment, the controller 100 performs the predetermined-direction moving process by moving the suction portions 21 from a position in the second predetermined direction X2 to a position in the first predetermined direction X1. During the predetermined-direction moving process and after the predetermined-direction moving process is complete, the multiple suction portions 21 overlap the mount 3 and the stack of articles Wt as viewed in the vertical direction.

In the present embodiment, as shown in FIG. 7, when the detection line R intersects with an article W (abnormal article Wa) on the target article group Ws, or in other words, when the article detector 5 detects an article W during the predetermined-direction moving process, the controller 100 controls the mover 4 to prevent the suction portions 21 from moving toward (in this embodiment, lowering to) the target article group Ws after the predetermined-direction moving process is complete. In the present embodiment, when the controller 100 prohibits the suction portions 21 from lowering, the unloading operation is determined to be abnormal. A notification indicating the abnormality is then provided. The abnormality notification is provided with, for example, an abnormality alarm output from a speaker or a buzzer, a lighted abnormality indicator lamp, abnormality information transmitted to a terminal operated by a user, or with other methods. In this structure, when one or more articles W included in the target article group Ws are not separated from the stack of articles Wt in the layer below and remain, the remaining articles W are detected in the subsequent unloading operation. The suction portions 21 can be stopped from lowering. This can reduce the possibility of the suction portions 21 hitting the abnormal article Wa. Such hitting can also be avoided when the control information 101 includes errors. For example, the controller 100 may incorrectly identify the number of separate layers as N+1, although the number of initial layers is M and the correct number of layers separated by the unloader 1 is N. In this case, the controller 100 identifies the stack of articles Wt including M–N–1 layers that are fewer than actual M–N layers. However, the controller 100 can detect an article W in the M–Nth (topmost) layer in the unloading operation and can stop the suction portions 21 from lowering. The controller 100 may identify the number of separate layers incorrectly due to factors including, for example, a restoration process performed after an abnormal situation such as a power failure.

In the present embodiment, as shown in FIG. 5, when the article detector 5 detects no article W during the predetermined-direction moving process, the controller 100 after performing the predetermined-direction moving process operates the mover 4 to move the suction portions 21 in the vertical direction toward the target article group Ws. In response to the suction surface 21a coming in contact with the upper surface 11 of the target article group Ws, the controller 100 stops the mover 4, causes the suction portion 21 to suction the upper surface 11 of the target article group Ws, and operates the mover 4 to increase the distance between the upper surface of the mount 3 and the suction surface 21a, thus separating the target article group Ws from the stack of articles Wt. In the present embodiment, when the article detector 5 detects no article W during the predetermined-direction moving process, the controller 100 controls the mover 4 to lower the multiple suction portions 21 toward the target article group Ws. In response to the suction surface 21a of the multiple suction portions 21 coming in contact of the upper surface 11 of articles W included in the target article group Ws, the controller 100 controls the mover 4 to stop lowering the suction portions 21. The controller 100 then controls the suction device 2 to switch the multiple suction portions 21 from the suction release state to the suction state. The controller 100 controls the suction device 2 and the mover 4 to lift the suction portions 21 suctioning and holding the target article group Ws from the stack of articles Wt below the target article group Ws. The target article group Ws is thus separated and lifted from the mount 3 and the stack of articles Wt. In the example shown in FIG. 4, no article W is located on the target article group Ws. The article detector 5 thus detects no article W. In this case, the controller 100 lowers the suction portions 21. In response to the suction surface 21a coming in contact with the upper surface 11 of the target article group Ws, the controller 100 gradually slows the speed for lowering the suction portions 21 to zero. The suction portions 21 then suction the target article group Ws. The mover 4 lifts the target article group Ws from the stack of articles Wt below and separates the target article group Ws (refer to FIG. 6). In the example shown in FIG. 7, one or more articles W in the target article group Ws are not separated and left on the stack of articles Wt after these operations. In this case, such articles W are detected in the predetermined-direction moving process before the subsequent separation operation. Thus, the suction portions 21 stop without lowering, and no subsequent separation operation follows.

In the present embodiment, as shown in FIGS. 1 and 2, the controller 100 separates the target article group Ws from the stack of articles Wt on the mount 3 in the pickup area 7, and then performs a transfer process. The transfer process includes operating the suction portions 21 and the mover 4 to move the separated target article group Ws to the transfer area 8 and place the separated target article group Ws in the transfer area 8. In the present embodiment, the controller 100 controls the suction device 2 and the mover 4 to move the separated target article group Ws and the suction portions 21 suctioning and holding the separated target article group Ws from the pickup area 7 to the transfer area 8. More specifically, the controller 100 controls the mover 4 to place the suctioned and held target article group Ws on the pallet P in the transfer area 8 or on the stack of articles Wt on the pallet P when the stack of articles Wt is located on the pallet P. The controller 100 then controls the suction device 2 to switch the suction portions 21 from the suction state to the suction release state. In this manner, the target article group Ws separated from the stack of articles Wt in the pickup area 7 is transferred from the pickup area 7 to the transfer area 8.

The controller 100 then controls the mover 4 to move the suction portions 21 to the standby area 9 before starting the subsequent predetermined-direction moving process. In the present embodiment, the controller 100 controls the mover 4 to move the suction portions 21 after transferring the target article group Ws to the transfer area 8 to the standby position P0 in the standby area 9 adjacent to the pickup area 7 in the second predetermined direction X2. With the standby area 9 being adjacent to the pickup area 7 in the second predetermined direction X2, the predetermined-direction moving process can be performed with the suction surface 21a of the suction portions 21 at an appropriate height from the upper surface 11 of the target article group Ws when the transfer process causes the multiple layers of the target article group Ws (stack of articles Wt) stacked in the transfer area 8 to be higher than the stack of articles Wt in the pickup area 7. The controller 100 may move the suction portions 21 after transferring the target article group Ws to the transfer area 8 directly to the second reference position P2, instead of to the standby position P0 in the standby area 9.

The first transfer process will now be described. The structures common to the second transfer process are not described herein. In the present embodiment, as shown in FIG. 8, to separate a first initial target article group Ws from the stack of articles Wt in the initial state, the controller 100 obtains the control information 101 including the initial height detected by the height detector 10. The controller 100 performs an initial predetermined-direction moving process of operating the mover 4 to move the suction portions 21 in the first predetermined direction X1 relative to the mount 3 to switch from a state in which the vertical relative distance M based on the control information 101 is greater than zero and less than the predetermined distance L and in which the detection line R is located in the second predetermined direction X2 from the target article group Ws to a state in which the detection line R is located in the first predetermined direction X1 from the target article group Ws. In the present embodiment, the controller 100 controls the mover 4 to move (in the example of FIG. 8, to lower) the suction portions 21 from the standby position P0 in the standby area 9 to a first reference position P1. The first reference position P1 is, in the standby area 9, variable in the vertical direction depending on the initial height detected by the height detector 10. At the first reference position P1, the suction surface 21a is located higher by the vertical relative distance M than the upper surface 11 of the target article group Ws. The initial predetermined-direction moving process is performed with the vertical relative distance M being less than in the predetermined-direction moving process. More specifically, the initial predetermined-direction moving process is performed with the vertical relative distance M based on the control information 101 being greater than zero and less than the predetermined distance L. Thus, the detection line R of the article detector 5 overlaps the target article group Ws as viewed along the predetermined width axis Y during the initial predetermined-direction moving process. In the present embodiment, as shown in FIG. 8, the initial predetermined-direction moving process is performed with the vertical relative distance M based on the control information 101 being greater than the margin distance B and less than a value obtained by subtracting the margin distance B from the predetermined distance L. Thus, when the suction surface 21a deviates downward by the maximum value of errors in the vertical relative position between the mount 3 and the suction surface 21a caused by the mover 4, the target article group Ws is less likely to be hit by the suction portions 21 during the initial predetermined-direction moving process. When the suction surface 21a deviates upward by the maximum value of errors in the vertical relative position between the mount 3 and the suction surface 21a caused by the mover 4, the detection line R interests with the target article group Ws during the initial predetermined-direction moving process. In the present embodiment, when the detection line R does not intersect with any articles W in an area during the initial predetermined-direction moving process, the controller 100 identifies the part of the topmost layer of the stack of articles Wt including no articles W. In the present embodiment, the detection line R extends along the predetermined width axis Y. Thus, the controller 100 can identify the topmost layer of the stack of articles Wt including an area without an article W corresponding to one or more rows along the predetermined width axis Y.

In the present embodiment, as shown in FIGS. 8 and 13, with an area in which the article detector 5 detects no article W during the initial predetermined-direction moving process, the mover 4 is prohibited from moving the suction portions 21 in the vertical direction toward the target article group Ws. More specifically, after performing the initial predetermined-direction moving process, the controller 100 controls the mover 4 to prevent the suction portions 21 from moving (in this case, lowering) toward the target article group Ws. When the controller 100 prohibits the suction portions 21 from lowering as described above, the unloading operation is determined to be abnormal. A notification indicating the abnormality is then provided. The abnormality notification is provided with, for example, an abnormality alarm output from a speaker or a buzzer, a lighted abnormality indicator lamp, abnormality information transmitted to a terminal operated by a user, or with other methods.

An unloading method in the present embodiment is described below with reference to the flowcharts shown in FIGS. 12, 13, and 14. In the present embodiment, the unloader 1 separates the target article group Ws in the stack of articles Wt in the pickup area 7 and transfers the target article group Ws to the transfer area 8.

The controller 100 determines whether the stack of articles Wt in the pickup area 7 is in the initial state, or in other words, whether no target article group Ws is separated from the stack of articles Wt (S01). When determining that the stack of articles Wt is in the initial state (Yes in S01), the controller 100 performs the first transfer process (S02). When determining that the stack of articles Wt is not in the initial state (No in S02), the controller 100 performs the second transfer process (S03).

To perform the first transfer process, the controller 100 obtains control information 101 from the suction device 2, the mover 4, the article detector 5, the height detector 10, and the management system 110 (S11). The controller 100 then moves the suction portions 21 to the first reference position P1 based on the control information 101 (S12). Subsequently, the controller 100 performs the initial predetermined-direction moving process of sliding the suction portions 21 at the height of the first reference position P1 relative to the mount 3 (stack of articles Wt) from a position in the first predetermined direction X1 to a position in the second predetermined direction X2 (S13). The controller 100 determines whether the topmost layer of the stack of articles Wt includes an area in which the article detector 5 detects no article W during the initial predetermined-direction moving process (S14). When determining that no article W is detected in the area (Yes in S14), the controller 100 prohibits the suction portions 21 from lowering (S21). For example, the topmost layer in FIG. 8 includes one or more rows including an area in which no article W is detected. Thus, the suction portions 21 are not lowered. When determining that the topmost layer does not include an area in which no article W is detected (No in S14), or in other words, all articles W as the target article group Ws are in the topmost layer of the stack of articles Wt, the controller 100 controls the mover 4 to lower the suction portions 21 (S15). In response to the suction portions 21 coming in contact with the upper surface 11 of the target article group Ws, the controller 100 stops lowering the suction portions 21 and switches the suction portions 21 from the suction release state to the suction state to suction the target article group Ws (S16). The controller 100 then lifts the suction portions 21 and separates the target article group Ws from the stack of articles Wt below the target article group Ws (S17). The controller 100 moves the suction portions 21 suctioning and holding the target article group Ws from the pickup area 7 to above the pallet P in the transfer area 8, or to above the stack of articles Wt when the stack of articles Wt is located on the pallet P (S18). The controller 100 then switches the suction portions 21 from the suction state to the suction release state (S19) and moves the suction portions 21 to the standby position P0 in the standby area 9 (S20).

To perform the second transfer process, the controller 100 obtains the control information 101 from the suction device 2, the mover 4, the article detector 5, the height detector 10, and the management system 110 (S31). The controller 100 then moves the suction portions 21 to the second reference position P2 based on the control information 101 (S32). The controller 100 then performs the predetermined-direction moving process of sliding the suction portions 21 at the height of the second reference position P2 relative to the mount 3 (stack of articles Wt) from a position in the first predetermined direction X1 to a position in the second predetermined direction X2 (S33). The controller 100 determines whether the article detector 5 detects an article W during the predetermined-direction moving process (S34). When determining that the article detector 5 detects an article W (Yes in S34), the controller 100 prohibits the suction portions 21 from lowering (S41). In the example shown in FIG. 7, the article detector 5 detects an article W remaining on the target article group Ws. Thus, the suction portions 21 are not lowered. When determining that the article detector 5 detects no article W (No in S34), the controller 100 controls the mover 4 to lower the suction portions 21 (S35). For example, the controller 100 gradually lowers the suction portions 21 from their positions shown in FIG. 4. In response to the suction portions 21 coming in contact with the upper surface 11 of the target article group Ws, the controller 100 stops lowering the suction portions 21 and switches the suction portions 21 from the suction release state to the suction state, allowing the suction portions 21 to suction the target article group Ws (S36). In the example shown in FIG. 5, the suction portions 21 are lowered to suction the target article group Ws. The controller 100 then lifts the suction portions 21 suctioning the target article group Ws and separates the target article group Ws from the stack of articles Wt below the target article group Ws (S37). FIG. 6 shows the target article group Ws suctioned in FIG. 5 being lifted, or in other words, separated from the stack of articles Wt below the target article group Ws. The controller 100 moves the suction portions 21 suctioning the target article group Ws from the pickup area 7 to above the pallet P in the transfer area 8, or to above the stack of articles Wt when the stack of articles Wt is located on the pallet P (S38). The controller 100 then switches the suction portions 21 from the suction state to the suction release state (S39) and moves the suction portions 21 to the standby position P0 in the standby area 9 (S40).

Other Embodiments (1) In the above embodiment, the suction portions 21 are components extendable in the vertical direction, such as suction pads. In some embodiments, the suction portions 21 may be undeformable in the vertical direction. For example, each suction portion 21 may not be a bellows and may be a suction pad with a suction surface 21a that does not deform. In some embodiments, when, for example, an article W includes a portion formed from a magnetic material such as iron, each suction portion 21 may attract the article W with a magnetic force. In this case, each suction portion 21 may include a permanent magnet or an electromagnet.

(2) In the above embodiment, the controller 100 moves the suction portions 21 from a position in the second predetermined direction X2 relative to the mount 3 (stack of articles Wt) to a position in the first predetermined direction X1 while maintaining the mount 3 (stack of articles Wt) at a horizontal position. In some embodiments, for example, the controller 100 may move the mount 3 (stack of articles Wt) from a position in the second predetermined direction X2 relative to the suction portions 21 to a position in the first predetermined direction X1 while maintaining the suction portions 21 at horizontal positions.

(3) In the above embodiment, the controller 100 lowers the suction portions 21 while maintaining the mount 3 (stack of articles Wt) at a vertical position. Thus, the suction portions 21 are relatively nearer the mount 3. In some embodiments, for example, the controller 100 may lift the mount 3 (stack of articles Wt) while maintaining the suction portions 21 at vertical positions. The mount 3 may thus be relatively nearer the suction portions 21. In this case, a lifter may be installed in the pickup area 7, for example, and the pallet P as the mount 3 and the stack of articles Wt placed on the lifter may be lifted or lowered.

(4) In the above embodiment, the predetermined distance L is greater than or equal to the maximum value of errors in the vertical relative position between the mount 3 and the suction portions 21 caused by the mover 4 and is less than or equal to the article height H. In some embodiments, the predetermined distance L may be greater than the article height H. When errors in the vertical relative position between the mount 3 and the suction portions 21 caused by the mover 4 are negligibly small, the predetermined distance L may be set without reflecting the errors.

(5) In the above embodiment, the mover 4 includes robotic arms 46 (the first arm 43, the second arm 44) operable to move the suction portions 21 along the predetermined axis X, along the predetermined width axis Y, and in the vertical direction. In some embodiments, the mover 4 may include a three-axis robot including a moving assembly that moves the suction portions 21 in different three directions, or along the predetermined axis X, along the predetermined width axis Y, and in the vertical directions.

(6) In the above embodiment, the transfer area 8 is set adjacent to the pickup area 7 along the predetermined width axis Y, and the standby area 9 is set adjacent to the pickup area 7 in the second predetermined direction X2. This is not limitative. For example, as in the example shown in FIG. 15, the transfer area 8 may be set in the second predetermined direction X2 from the pickup area 7, and the standby area 9 may be set between the pickup area 7 and the transfer area 8 along the predetermined axis X. In the example shown in FIG. 15, the lateral direction in the figure is the predetermined axis X unlike in the example shown in FIG. 1. In this case, the transfer area 8 is set to be located in the second predetermined direction X2 from the pickup area 7 with a space greater than or equal to the dimension of the suction device 2 (more specifically, the suction support 22) along the predetermined axis X in between. Thus, the standby area 9 can be set appropriately between the pickup area 7 and the transfer area 8 along the predetermined axis X.

(7) In the above embodiment, the controller 100 performs the initial predetermined-direction moving process to separate the initial target article group Ws from the stack of articles Wt in the initial state. In some embodiments, the mover 4 may not perform the initial predetermined-direction moving process on the stack of articles Wt in the initial state. In this case, when, for example, the stack of articles Wt in the initial state includes the topmost layer including an area without an article W, the suction portions 21 may suction all the articles W in the topmost layer and transfer the articles W to an area different from the transfer area 8.

(8) In the above embodiment, the controller 100 computes the vertical dimension of the current stack of articles Wt being the vertical relative distance M by subtracting the separated height from the initial height. The separated height results from multiplying the article height H by the number of separate layers, and the article height H results from dividing the initial height by the number of initial layers. This is not limitative. For example, the suction device 2 may include a range sensor to measure the vertical relative distance M.

(9) The structure described in each of the above embodiments may be combined with any other structures described in the other embodiments unless any contradiction arises. This also applies to combinations of the embodiments described as other embodiments. The embodiments described herein are merely illustrative in all respects and may be modified variously as appropriate without departing from the spirit and scope of the present disclosure.

Overview of Embodiments

The embodiments of the unloader described above are overviewed below.

An unloader according to an embodiment of the present disclosure is an unloader for separating a target article group of articles in a topmost layer of a stack of articles on a mount. The unloader includes a suction device including a suction portion to suction an upper surface of the target article group to hold the target article group, a mover that moves the mount and the suction portion relative to each other along a predetermined axis parallel to a horizontal direction and in a vertical direction, a controller that controls the suction device and the mover, and an article detector that detects, at a position spaced downward from a suction surface by a predetermined distance and adjacent to the suction surface in a first predetermined direction being one direction along the predetermined axis, an article intersecting with a detection line extending along a predetermined width axis being parallel to the horizontal direction and orthogonal to the predetermined axis. The suction surface is a surface of the suction portion to be in contact with the upper surface of the target article group. The controller obtains control information to compute a vertical relative distance being a relative distance between the upper surface of the target article group and the suction surface in the vertical direction, performs a predetermined-direction moving process of operating the mover to move the suction portion relative to the mount in the first predetermined direction to switch from a state in which the vertical relative distance based on the control information is greater than a greater one of an article height being a vertical dimension of the article included in the target article group or the predetermined distance and is less than a total length of the article height and the predetermined distance and in which the detection line is located in a second predetermined direction being another direction along the predetermined axis from the target article group to a state in which the detection line is located in the first predetermined direction from the target article group, and prohibits the mover from operating to move the suction portion in the vertical direction toward the target article group when the article detector detects the article during the predetermined-direction moving process.

In this structure, the detection line moves along the upper surface of the target article group along the predetermined axis with the vertical relative distance being greater than the greater one of the article height or the predetermined distance and less than the total length of the article height and the predetermined distance. This allows appropriate detection of an article above the upper surface of the target article group.

When such an article is detected, or in other words, when an article is located in an area that is expected to include no article, the mover is prohibited from operating to move the suction portion in the vertical direction toward the target article group. This reduces the possibility of at least one of the suction portion or the article being damaged from a collision between them.

This structure thus can appropriately detect an article in the topmost layer and can reflect the detection result in its unloading operation.

In the above embodiment, when the article detector detects no article during the predetermined-direction moving process, the controller may operate the mover to move the suction portion in the vertical direction toward the target article group after the predetermined-direction moving process, stop the mover in response to the suction portion coming in contact with the upper surface of the target article group, cause the suction portion to suction the upper surface of the target article group, and operate the mover to increase a distance between an upper surface of the mount and the suction surface to separate the target article group from the stack of articles.

This structure can appropriately separate the target article group from the stack of articles below when no article is left on the topmost layer of the stack of articles and the control information is correct.

The predetermined distance may be greater than a maximum value of errors in a vertical relative position between the mount and the suction portion caused by the mover and may be less than or equal to the article height.

In this structure, the predetermined distance is greater than the maximum value of errors in the vertical relative position between the mount and the suction portion. Thus, when the error is maximum, an article above the upper surface of the target article group is less likely to interfere with the suction portion during the predetermined-direction moving process.

With the predetermined distance less than or equal to the article height, the suction portion after completing the predetermined-direction moving process is less likely to move a greater distance to move toward the target article group to suction the target article group. Thus, the unloading operation is less likely to have a longer cycle time.

The mover moves the suction portion along the predetermined axis, along the predetermined width axis, and in the vertical direction. The article detector is connected to the suction portion and moves integrally with the suction portion. The mount is located in a pickup area. A transfer area is set adjacent to the pickup area in one direction along the predetermined width axis. A standby area is set adjacent to the pickup area in the second predetermined direction. The controller separates the target article group from the stack of articles on the mount in the pickup area, perform a transfer process of operating the suction portion and the mover to move the separated target article group to the transfer area and place the separated target article group in the transfer area, and operate the mover to move the suction portion to the standby area before starting a subsequent predetermined-direction moving process.

In this structure, the suction portion suctions the target article group, which is then moved to the transfer area by the mover and released from suction by the suction portion. Thus, the transfer process is appropriately performed, allowing the target article group to be separated by one layer at a time from the stack of articles including multiple layers and transferred to the transfer area.

The suction portion moves to the standby area after the transfer process, allowing the subsequent predetermined-direction moving process to start promptly.

In this structure, the standby area is set in the second predetermined direction from the pickup area, allowing the distance between the pickup area and the transfer area to be reduced easily. Thus, the unloading operation may use a smaller space, and the suction portion may move from the pickup area to the transfer area more quickly. This may reduce the cycle time for the unloading operation.

Additionally, the standby area is located in the second predetermined direction from the pickup area in this structure. The transfer process may cause the multiple layers of the target article group stacked in the transfer area to be higher than the stack of articles in the pickup area. With the pickup area at a smaller distance from the transfer area, the transfer area allows the predetermined-direction moving process to be performed without the suction portion interfering with the multiple layers of target articles in the transfer area and performed with the suction surface of the suction portion being at an appropriate height from the upper surface of the target article group.

The unloader may further include a height detector that detects an initial height being a vertical dimension of a stack of articles in an initial state in which no target article group is separated. When a first target article group is separated from the stack of articles in the initial state, the controller may obtain the control information including the initial height detected by the height detector, perform an initial predetermined-direction moving process of operating the mover to move the suction portion in the first predetermined direction relative to the mount to switch from a state in which the vertical relative distance based on the control information is greater than zero and less than the predetermined distance and in which the detection line is located in the second predetermined direction from the target article group to a state in which the detection line is located in the first predetermined direction from the target article group, and prohibit, with an area in which the article detector detects no article during the initial predetermined-direction moving process, the mover from operating to move the suction portion in the vertical direction toward the target article group.

In the present structure, when the target article group in the topmost layer of the stack of articles in the initial state includes fewer articles, or in other words, when an article expected to be in the target article group is missing from the position at which the article is expected to be, the absence of the article can be appropriately detected, and the mover can be prohibited from operating to move the suction portion in the vertical direction toward the target article group. Thus, when an article expected to be in the target article group is missing from the position at which the article is expected to be, an operation for separating the target article group may not be performed.

The unloader may further include a height detector that detects an initial height being a vertical dimension of a stack of articles in an initial state in which no target article group is separated. The control information may include information about the initial height detected by the height detector, information about a number of initial layers being a number of layers in the stack of articles in the initial state, and information about a number of separate layers being a number of layers of the target article group separated from the stack of articles in the initial state. The controller may compute a vertical dimension of a current stack of articles being the vertical relative distance by subtracting a separated height from the initial height. The separated height may result from multiplying the article height by the number of separate layers. The article height may result from dividing the initial height by the number of initial layers.

In this structure, single detection of the vertical dimension of the stack of articles in the initial state is performed first to allow multiple layers of the target article group to be sequentially separated, without further detection of the vertical dimension of the stack of articles.

The unloader according to one or more embodiments of the present disclosure may produce at least one of the effects described above.

What is claimed is:

1. An unloader for separating a target article group of articles in a topmost layer of a stack of articles on a mount, the unloader comprising:
   a suction device comprising a suction portion to suction an upper surface of the target article group to hold the target article group;
   a mover configured to move the mount and the suction portion relative to each other along a predetermined axis parallel to a horizontal direction and in a vertical direction;
   a controller configured to control the suction device and the mover; and
   an article detector configured to detect, at a position spaced downward from a suction surface by a predetermined distance and adjacent to the suction surface in a first predetermined direction that is one direction along the predetermined axis, an article intersecting with a detection line extending along a predetermined width axis that is parallel to the horizontal direction and orthogonal to the predetermined axis, the suction surface is a surface of the suction portion to be in contact with the upper surface of the target article group, and
   wherein:
   the controller obtains control information to compute a vertical relative distance that is a relative distance between the upper surface of the target article group and the suction surface in the vertical direction,
   performs a predetermined-direction moving process of operating the mover to move the suction portion relative to the mount in the first predetermined direction to switch from a state in which the vertical relative distance based on the control information is greater than a greater one of an article height that is a vertical dimension of the article included in the target article group or the predetermined distance and is less than a total length of the article height and the predetermined distance and in which the detection line is located in a second predetermined direction that is another direction along the predetermined axis from the target article group to a state in which the detection line is located in the first predetermined direction from the target article group, and
   prohibits the mover from operating to move the suction portion in the vertical direction toward the target article group when the article detector detects the article during the predetermined-direction moving process.

2. The unloader according to claim 1, wherein:
   when the article detector detects no article during the predetermined-direction moving process, the controller operates the mover to move the suction portion in the vertical direction toward the target article group after the predetermined-direction moving process, stops the mover in response to the suction portion coming in contact with the upper surface of the target article group, causes the suction portion to suction the upper surface of the target article group, and operates the mover to increase a distance between an upper surface of the mount and the suction surface to separate the target article group from the stack of articles.

3. The unloader according to claim 1, wherein:

the predetermined distance is greater than or equal to a maximum value of errors in a vertical relative position between the mount and the suction portion caused by the mover and is less than or equal to the article height.

4. The unloader according to claim 1, wherein:

the mover moves the suction portion along the predetermined axis, along the predetermined width axis, and in the vertical direction, the article detector is connected to the suction portion and moves integrally with the suction portion, the mount is located in a pickup area, a transfer area is set adjacent to the pickup area in one direction along the predetermined width axis, and a standby area is set adjacent to the pickup area in the second predetermined direction, and the controller separates the target article group from the stack of articles on the mount in the pickup area, performs a transfer process of operating the suction portion and the mover to move the separated target article group to the transfer area and place the separated target article group in the transfer area, and operates the mover to move the suction portion to the standby area before starting a subsequent predetermined-direction moving process.

5. The unloader according to claim 1, further comprising:

a height detector configured to detect an initial height that is a vertical dimension of a stack of articles in an initial state in which no target article group is separated, and wherein:

when a first target article group is separated from the stack of articles in the initial state, the controller obtains the control information including the initial height detected by the height detector, performs an initial predetermined-direction moving process of operating the mover to move the suction portion in the first predetermined direction relative to the mount to switch from a state in which the vertical relative distance based on the control information is greater than zero and less than the predetermined distance and in which the detection line is located in the second predetermined direction from the target article group to a state in which the detection line is located in the first predetermined direction from the target article group, and prohibits, with an area in which the article detector detects no article during the initial predetermined-direction moving process, the mover from operating to move the suction portion in the vertical direction toward the target article group.

6. The unloader according to claim 1, further comprising:

a height detector configured to detect an initial height that is a vertical dimension of a stack of articles in an initial state in which no target article group is separated, and wherein:

the control information includes information about the initial height detected by the height detector, information about a number of initial layers being a number of layers in the stack of articles in the initial state, and information about a number of separate layers being a number of layers of the target article group separated from the stack of articles in the initial state, and the controller computes a vertical dimension of a current stack of articles that is the vertical relative distance by subtracting a separated height from the initial height, the separated height results from multiplying the article height by the number of separate layers, and the article height results from dividing the initial height by the number of initial layers.

* * * * *